Nov. 4, 1969 P. O. WEMAN 3,476,333
AUTOMATIC BELT WINDER FOR SAFETY BELTS
Filed Dec. 1, 1967 3 Sheets-Sheet 1

Inventor:
PER OLAF WEMAN
BY
Lary & Rinehart
ATTYS.

Nov. 4, 1969   P. O. WEMAN   3,476,333
AUTOMATIC BELT WINDER FOR SAFETY BELTS
Filed Dec. 1, 1967   3 Sheets-Sheet 3

Inventor:
PER OLAF WEMAN
By
Lowry & Pritchard
ATTYS.

3,476,333
AUTOMATIC BELT WINDER FOR SAFETY BELTS
Per Olaf Weman, Hamburg-Garstedt, Germany, assignor
 to Sigmatex AG, Basel, Switzerland, a firm
Filed Dec. 1, 1967, Ser. No. 687,328
Claims priority, application Germany, Feb. 22, 1967,
S 108,435
Int. Cl. B65h 75/48
U.S. Cl. 242—107.4                                          14 Claims

ABSTRACT OF THE DISCLOSURE

This invention provides an automatic belt winder comprising a housing, a belt reel, and axially displaceable locking and engaging members mounted on the shaft of the belt reel, plus an adjustable means for manually locking the belt reel. Any sudden acceleration or deceleration of the vehicle, or a sudden jerk on the belt brings the locking and engagement members into mutual engagement causing them to swing a lock pawl against the belt reel the edges of which are formed as toothed wheels, thus locking this belt reel.

BACKGROUND OF THE INVENTION

In prior art automatic belt winders, the housing is provided with a spring-loaded pair of pawls which, upon insertion of another lock member, engages a pinion arresting the belt reel so that the belt cannot be further pulled off the belt reel.

More advantageous, compared with this prior art device, are automatic belt winders in which the belt reel is automatically locked upon violent deceleration or acceleration of the vehicle, since such devices impair the passenger's freedom of motion in normal driving conditions much less.

Such prior art belt winders use a ball which is located in a cup and adapted to operate a locking mechanism upon being shifted out of its inoperative position, e.g. by inertia forces. However, these belt winders are relatively delicate and the belt is already locked when the longitudinal vehicle axis is only slightly inclined, e.g. on a hill slope. Moreover, the individual parts must be precision manufactured, which involves considerable manufacturing cost.

SUMMARY OF THE INVENTION

It is the object of the invention to provide an automatic belt winder which does not require the special operation of a lock member for locking the belt reel, but which operates automatically and, furthermore, is of simple design, is inexpensive to manufacture, requires no special servicing and is independent of the actual position of the longitudinal axis of the vehicle.

To attain this object, the present invention provides an automatic belt winder of the initially specified type, which comprises a housing, a belt reel mounted in said housing and formed by a rotatable, spring-loaded shaft and two guide discs mounted thereon for guiding the safety belt, a locking member floatingly mounted on said shaft for locking said belt reel, and engagement means for locking said locking member when it moves axially on said shaft.

Such a locking member is preferably axially displaceably braced by a compression spring. If with such an arrangement the vehicle is decelerated in the axial direction of the belt reel shaft, as for example in a collision, the locking member is hurled axially along the shaft and into engagement with the engagement means, whereby the belt is prevented from being further unrolled. For this purpose the locking member is preferably a toothed wheel seated on dogs provided on at least one of the guide discs for the belt reel. When the belt is rolled off the belt reel under normal conditions this locking member is carried along, whereas in the case of an accident, when it engages the engagement means, it retains the guide disc of the belt reel and thus the belt reel itself on the dogs.

This can be realized with slight expenditure by providing the locking member or toothed wheel with hook-shaped teeth which laterally project from the plane of the toothed wheel so as to be engageable with a disc-shaped barbed engagement means on the housing. Such engagement means is preferably in the form of a locking plate provided with one or more barbs and is preferably axially displaceable on the shaft. Owing to such axial displaceability it is sufficient to arrange the locking mechanism proposed by the invention on only one side of the belt reel because, when arranged towards the front of the vehicle, the toothed wheel in a collision is hurled forward and into engagement with the engagement means, whereas when another vehicle collides with the vehicle from behind, causing a violent acceleration of the vehicle, the axially displaceable locking plate is hurled against the toothed wheel. This interaction may be controlled by arranging a relatively weak spring between the toothed wheel and the locking plate to prevent the engagement of these two parts when the belt is rolled off its reel in normal driving conditions.

As drivers for the locking member, dogs arranged on the outer surface of a belt-reel guide disc and extending through openings in the locking member have proved to be expedient. Such dogs slant preferably towards their trailing end, with respect to the unrolling direction of rotation of the belt reel, to enable the locking member to climb outwardly away from the guide disc and into engagement with the engagement means on the occurrence of a sudden violent pull in the belt. It is self-evident that also the inverse solution is possible, in which the locking member is connected with the dogs and the guide disc is provided with openings for receiving them.

This design may be even more advantageous if the locking member is given a large mass to enable its movements to be more easily controlled.

Since with the proposed design of the locking mechanism, relatively powerful forces may act unidirectionally on the belt reel it may be of advantage to provide an additional locking mechanism adapted to act in the same degree on each of the pair of guide discs of the belt reel. To this end the guide discs of the belt reel are preferably provided in the form of ratchet wheels adapted to be locked by a lock pawl pivotally mounted in the housing.

When the belt reel is locked by the locking member, the lock pawl may also be positively brought into action by providing the locking plate on the shaft with a projection which upon rotation of the locking plate brings the lock pawl into its locking position.

According to a particularly advantageous feature the pivotable lock pawl may be provided with an adjustable element formed as a handle by the operation of which the belt reel can be locked independent of a pull in the shoulder belt. If required, the belt reel can be locked by adjusting this element.

For example, the belt reel can also be locked by adjusting an adjustable element to ensure, for example, that in normal driving conditions a passenger asleep may not tip over with the upper part of his body and fall from the seat.

Such an adjustable element is preferably provided in the form of a rotatably mounted eccentric disc which may have stops for a locking and a release position.

Moreover, it is possible to provide the lock pawl itself with a stop for a locking and a release position.

BRIEF DESCRIPTION OF THE DRAWINGS

An embodiment of the invention will now be described by way of example and with reference to the accompanying drawings, in which.

DESCRIPTION OF THE PREFERRED EMBODIMENT

Figure 1:
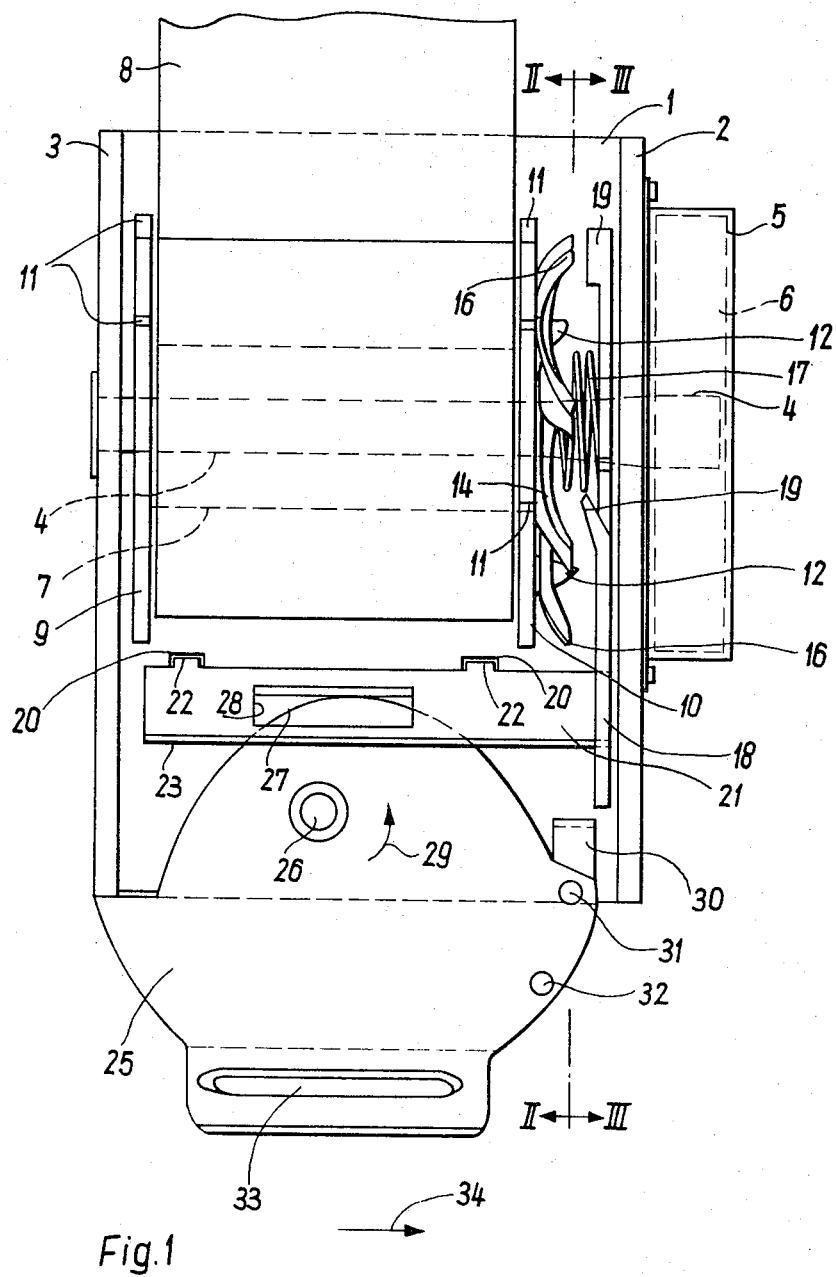
FIG. 1 is a top plan view of an automatic belt winder according to the invention.

Referring to FIG. 1, an automatic belt winder comprises a U-shaped housing consisting of a bottom 1 and two lateral walls 2 and 3 supporting a rotatable shaft 4. The shaft 4 extends beyond the lateral wall 2 and into a housing 5 accommodating a winding spring 6 which engages the shaft 4. The shaft 4 carries a sleeve 7 for winding up a shoulder strap 8, and two guide discs for the shoulder strap 8 which are in the form of ratchet wheels 9 and 10 and are provided with teeth 11. The shaft 4, the sleeve 7 and the ratchet wheels 9 and 10 constitute the belt reel.

Figure 2:
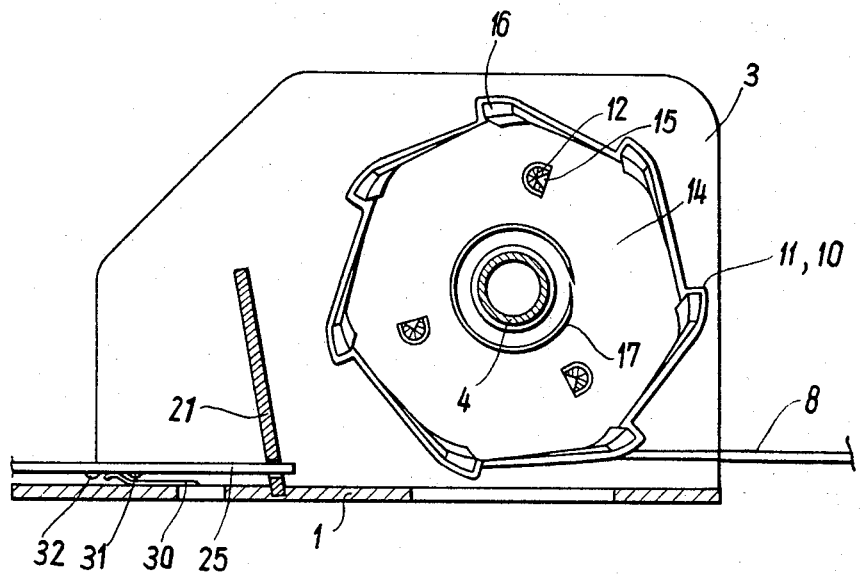
FIG. 2 is a cross section taken on the line II—II of FIG. 1.

As shown in FIG. 2, the ratchet wheel 10 carries on its outer face three dogs 12 which, in respect to the direction of unwinding of the belt reel, have a substantially conical, i.e. a forwardly and laterally descending, front side, and are provided with a plane rear side. The dogs 12 carry a locking member 14 in the form of a toothed wheel which is provided with three bores 15 (FIG. 2) contoured to match the dogs 12. The contrary solution is also quite possible, i.e. providing the dogs on the locking member 14, and the bores in the ratchet wheel 10.

As shown in FIG. 2, the locking member 14 is axially slidable on the shaft 4 and is provided with catch means 16 protruding laterally from its plane on the side opposite the ratchet wheel 10. The locking member 14 is engaged and held in place by a compression spring 17 which at the same time bears against a locking plate 18 which is provided with two barbs 19 constituting engagement means for locking the locking member 14. The locking plate 18 is axially slidable and rotatable to a very slight extent on the shaft 4 and its two barbs 19 protrude towards the inside of the belt winder. The catch means 16 engages behind the barbs 19 when the locking member moves relative to the locking plate 18 and against the pressure of the spring 17, as is the case when a vehicle suddenly is violently accelerated, i.e. upon the impact of another vehicle from behind.

Figure 3:
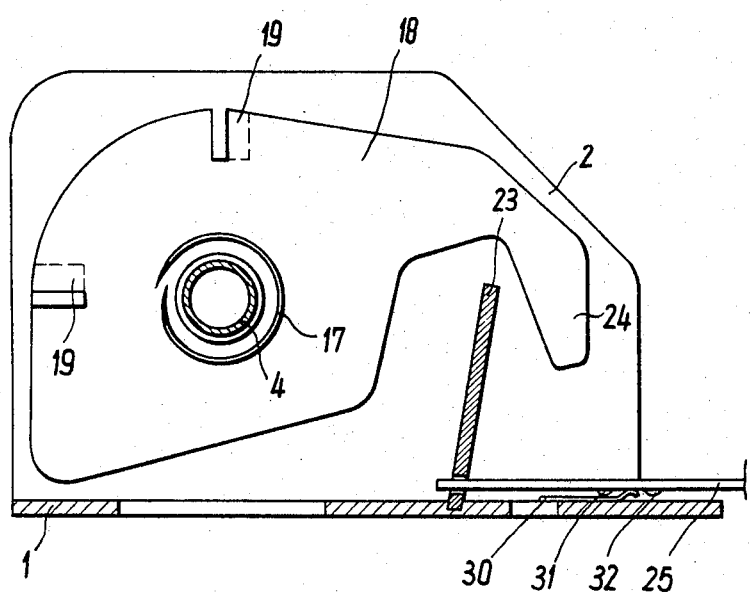
FIG. 3 is a similar cross section taken on the line III—III of FIG. 1.

Two recesses 20 engaged by projections 22 of a lock pawl 21 are provided in the bottom 1 below the belt reel. This pawl 21 is shown in its unlocking position in FIG. 1. With respect to FIG. 1, the lock pawl 21 can be tilted upwards to bring its upper edge 23 into the path of movement of the teeth 11 of the pair of ratchet wheels 9 and 10, thereby locking the belt reel in its actual position. The lock pawl 21 is brought into this locking position by the rotation of the locking plate 18 when this is carried along by the locking member 14. To this end the locking plate 18 is provided with a projection 24 (FIG. 3) adapted to be engaged by the upper edge 23 of the lock pawl 21.

Locking of the belt reel by the aid of the lock pawl 21 is further possible by means of an adjustable element in the form of an eccentric disc 25.

The eccentric disc 25 is rotatably mounted in the bottom 1 of the housing 5 by means of a pin 26 and provided with a lobe 27 engaging in a slot 28 in the lock pawl 21. When the eccentric disc 25 is rotated in the direction of the arrow 29 (FIG. 1), the lock pawl 21 is tilted out of its FIG. 1 position into its locking position.

From FIG. 1 it is further apparent that a spring 30 is secured to the lower portion of the bottom 1 of the housing 5 for co-operation with two stops 31 and 32 of the eccentric disc 25 in such a manner as to hold the eccentric disc 25 in the release position of FIG. 1 and so as to hold it in contact with the stop 32 when a strong pressure or force is applied to the eccentric disc 25 in the direction of the arrow 29, in which position the eccentric disc 25 locks the belt reel by means of the lock pawl 21. Similar stops for a release and a locking position may be provided for the lock pawl 21.

The lower end of the eccentric disc 25 is provided with an eye 33 for manipulating it.

If, when the vehicle is moving, there is a deceleration in the direction of the arrow 34, e.g. due to a collision, the locking member 14 on the shaft 4 is hurled forwardly into engagement with the barbs 19 of the locking plate 18. Thereby the shoulder strap 8 cannot be further unrolled, since in this engaged position the ratchet wheel 10 is still in engagement with the locking member 14 through the dogs 12. At the same time, the strong tension in the shoulder strap 8 causes the locking plate 18 to rotate and pivot the lock pawl 21 by means of its projection 24 from its illustrated position (FIG. 3) into the locking position so that the tension in the shoulder strap 8 is uniformly distributed between the pair of ratchet wheels 9 and 10. This arrangement avoids the formation of major axial forces so that the locking member 14 and the lock-disc 18 can be made of an inexpensive material which need not have high-strength properties. Moreover, the lateral walls 2 and 3 of the housing 5 are prevented from being bent apart under a major load.

Locking the belt reel is also brought about by a sudden violent acceleration of the vehicle, as for example in an accident where another vehicle collides with the vehicle from behind. In this case the locking plate 18 moves backwards or, in FIG. 1, to the left against the pressure of the spring 17, thereby coming into engagement with the locking member 14 to establish the above-described conditions.

When the shoulder strap 8 is unrolled by jerks or very fast, as under a sudden high stress, the locking member 14 moves up on the dogs 12 or, as in FIG. 1, to the right, coming into its locking position so that, consequently, also when the shoulder strap 8 is subjected to a sudden high stress the belt reel is locked, independent of the force of deceleration acting on the vehicle.

This action assists the other action in which the locking is effected only by the deceleration acting on the housing 5 of the belt winder. Both actions thus form a combined action.

Furthermore, the belt reel is locked when, upon a pull on the eccentric disc 25, the locking force of the spring 30 is overcome and the lock pawl 21 is brought into its locking position by the rotation of the eccentric disc 25.

If the passenger should want to be relieved from a constant tension in the shouldetr strap 8 without unfastening it, it is sufficient to rotate the eccentric disc 25 in order to block the belt reel.

Moreover, it has been found expedient to form the shaft 4 in the region of the locking plate 18 such that it tapers towards the belt reel, thereby obtaining that also, in the case of diagonal impacts from behind, the locking plate 18 flies easily against the locking member 14 to effect the locking.

The invention may be embodied in other specific forms without departing from the spirit or essential characteristics thereof. The present embodiment is therefore to be considered in all respects as illustrative and not restrictive.

What is claimed is:
1. An automatic belt winder for safety belts comprising,
   (a) a housing,
   (b) means mounting a spring loaded, rotatable shaft in said housing to form a belt reel,
   (c) two disc members mounted on said shaft in spaced relationship with respect to each other to guide a safety belt onto said belt reel,
   (d) a locking means floatingly mounted on said shaft,
   (e) plate means rotatably mounted on said shaft to engage said locking means, and
   (f) a lock pawl means tiltably mounted in said housing and having a locked reel position wherein said pawl means postively engage each of the disc members to lock said belt reel in place,
   (g) said plate means includes a lock pawl engaging means which moves said lock pawl means into said locked reel position when said plate means rotates through an angle of rotation.

2. A belt winder as defined in claim 1 wherein said lock pawl engaging means include a projection mounted on said plate means.

3. A belt winder as defined in claim 2 wherein said projection includes a cam surface which contacts said lock pawl means to effect movement thereof when said plate means rotates through said angle of rotation.

4. A belt winder as defined in claim 2 wherein said disc members comprise ratchet wheels which engage said lock pawl means in said locked reel position.

5. A belt winder as defined in claim 1 wherein said locking means include a compression biasing means and a locking member which is axially displaceable against said biasing means.

6. A belt winder as defined in claim 1 wherein said lock pawl means include stops to position said lock pawl means in said locked reel position and a release resting position.

7. A belt winder as defined in claim 1 wherein said belt winder includes a movably mounted member for positioning said tiltable lock pawl means in said locked reel position and a release resting position.

8. A belt winder as defined in claim 7 wherein said movably mounted member comprises a rotatably mounted eccentric disc.

9. A belt winder as defined in claim 8 wherein said lock pawl means includes a plate-shaped member having a slotted opening which provides a contacting means for effecting corresponding movement between said plate-shaped member and said eccentric disc.

10. A belt winder as defined in claim 8 wherein said eccentric disc carries stops to limit movement of said lock pawl means between said locked reel position and said release resting position.

11. A belt winder as defined in claim 7 wherein said positioning member includes an opening to receive a hip strap of said safety belt.

12. A belt winder as defined in claim 5 wherein said locking member and said plate means are each axially displaceable against said compression biasing means.

13. A belt winder as defined in claim 5 wherein said plate means include at least one barb to engage said locking member.

14. A belt winder as defined in claim 13 wherein said locking member is juxtaposed one of said disc members,
said juxtaposed disc member includes at least one dog which extends through corresponding openings in the locking member.

References Cited

UNITED STATES PATENTS

| | | | |
|---|---|---|---|
| 2,825,581 | 3/1958 | Knight | 242—107.4 X |
| 2,843,335 | 7/1958 | Hoven et al. | 242—107.4 |
| 3,058,687 | 10/1962 | Bentley | 242—107.4 |
| 3,240,510 | 3/1966 | Spouge | 242—107.4 X |
| 3,294,446 | 12/1966 | Fontaine | 242—107.4 X |
| 3,323,749 | 6/1967 | Karlsson | 242—107.4 |

MERVIN STEIN, Primary Examiner
W. H. SCHROEDER, Assistant Examiner